United States Patent
Abe et al.

(10) Patent No.: US 7,430,092 B2
(45) Date of Patent: Sep. 30, 2008

(54) CONTROL APPARATUS, STORAGE APPARATUS, AND COMPUTER PRODUCT

(75) Inventors: Yukio Abe, Kawasaki (JP); Takeshi Hara, Kawasaki (JP); Mitsuo Kamimura, Kawasaki (JP); Shunji Saitoh, Higashine (JP)

(73) Assignee: Fujitsu Limited, Kawasaki (JP)

( * ) Notice: Subject to any disclaimer, the term of this patent is extended or adjusted under 35 U.S.C. 154(b) by 50 days.

(21) Appl. No.: 11/700,384

(22) Filed: Jan. 31, 2007

(65) Prior Publication Data

US 2008/0055767 A1    Mar. 6, 2008

(30) Foreign Application Priority Data

Aug. 29, 2006    (JP) .............................. 2006-232320

(51) Int. Cl.
*G11B 5/596* (2006.01)

(52) U.S. Cl. ............... 360/77.11; 360/77.07; 360/77.04

(58) Field of Classification Search ....................... None
See application file for complete search history.

(56) References Cited

U.S. PATENT DOCUMENTS

| 6,781,780 B1 * | 8/2004 | Codilian | ..................... 360/60 |
| 2005/0141125 A1 * | 6/2005 | Yatsu | .......................... 360/75 |

FOREIGN PATENT DOCUMENTS

| JP | 05-020789 | 1/1993 |
| JP | 06-052636 | 2/1994 |
| JP | 2001-014606 | 1/2001 |
| JP | 2004-047023 | 2/2004 |

* cited by examiner

*Primary Examiner*—Andrew L. Sniezek
(74) *Attorney, Agent, or Firm*—Greer, Burns & Crain, Ltd.

(57) ABSTRACT

Offtrack amounts corresponding to every servo in which data writing has been completed is stored in a storage unit. Offtrack amount corresponding to a next servo frame, which is a servo frame present next to a servo frame for which data has been written, is calculated from the offtrack amounts stored in the storage unit. Based on the offtrack amount of the next servo frame, it is decided whether data needs to be rewritten in a sector present before the next servo frame.

9 Claims, 9 Drawing Sheets

CONTROL APPARATUS, STORAGE APPARATUS, AND COMPUTER PRODUCT

BACKGROUND OF THE INVENTION

1. Field of the Invention

The present invention relates to a data rewriting technique, and particularly relates to data rewriting control when a write fault occurs.

2. Description of the Related Art

In a conventional magnetic disk apparatus, if a write fault occurs while data is being written, data is rewritten in a predetermined number of sectors located before the sector where the write fault has occurred. A conventional technology has been disclosed, for example, in Japanese Patent Application Laid-open No. H5-207789.

The reason for rewriting the data in the sectors located before the sector where the write fault occurs is as follows. Due to intermittent nature of servo sampling for detecting an offtrack position, if a write fault occurs due to the offtrack position or the like, it is probable that data in sectors between a previous servo frame (where it is assumed that data is written at a normal track position) of a servo frame where the offtrack position is detected and a servo frame where the offtrack position is detected is written off track. Therefore, it is necessary to rewrite the data in the sectors between the two servo frames to a center of a track.

Thus, the number of sectors in which data is to be rewritten should include the sector including the servo frame where the write fault is detected.

Generally, a magnetic disk is divided into zones from an outer periphery to an inner periphery to increase a recording density of the magnetic disk. The number of sectors varies in every track from the outermost track to the innermost track in a zone. However, the number of servo frames of all the tracks in a zone is the same to keep the servo sampling constant.

More sectors are present between any two servo frames towards the outer periphery, and smaller sectors are present between any two servo frames towards the inner periphery. However, the maximum number of sectors between two frames in the outermost track is generally set as a fixed value for the number of sectors in which the data is to be rewritten.

However, in the conventional technology, if a write fault is included in sectors where the writing process is completed, the write fault remains unaddressed because no determination process is carried out to determine whether the data needs to be rewritten in the sectors where the writing process has been completed.

Even if it is determined that the writing process is successfully completed at the point in time when the writing is completed, the data itself may possibly be written off track due to the offtrack position of the head. Furthermore, the magnetic disk apparatus installed in a portable device (such as a portable data tool or a portable music player) likely to be carried on a train or plane, or when walking or hiking, etc, is constantly at risk of being subjected to continuous jolts or being exposed to variations in atmospheric pressure. As newer devices that use magnetic disk apparatuses emerge, a rewriting process is essential to meet the challenges in the form of environment in which the devices are likely to be used.

SUMMARY OF THE INVENTION

It is an object of the present invention to at least partially solve the problems in the conventional technology.

According to an aspect of the present invention, a control apparatus that controls a storage apparatus to rewrite data when a write fault occurs while the data is being written to a storage medium included in the storage apparatus includes a storage unit that stores therein an offtrack amount of a head of the storage apparatus when the head writes data in each servo frame on the storage medium using a plurality of servo frames recorded on the storage medium; a calculating unit that calculates an offtrack amount corresponding to a next servo frame, which is a servo frame present next to a data-writing-complete servo frame for which the head has completed data writing, based on the offtrack amounts stored in the storage unit; and a rewrite determining unit that determines, based on the offtrack amount of the next servo frame calculated by the calculating unit, whether the data needs to be rewritten in a sector located before the next servo frame.

According to another aspect of the present invention, a storage apparatus that rewrites data when a write fault occurs while the data is being written to a storage medium included in the storage apparatus includes a storage unit that stores therein an offtrack amount of a head of the storage apparatus when the head writes data in each servo frame on the storage medium using a plurality of servo frames recorded on the storage medium; a calculating unit that calculates an offtrack amount corresponding to a next servo frame, which is a servo frame present next to a data-writing-complete servo frame for which the head has completed data writing, based on the offtrack amounts stored in the storage unit; and a rewrite determining unit that determines, based on the offtrack amount of the next servo frame calculated by the calculating unit, whether the data needs to be rewritten in a sector located before the next servo frame.

According to still another aspect of the present invention, a computer-readable recording medium that stores therein a computer program that causes a computer to rewrite data when a write fault occurs while the data is being written to a storage medium included in a storage apparatus, the computer program causing the computer to execute storing in a storage unit an offtrack amount of a head of the storage apparatus when the head writes data in each servo frame on the storage medium using a plurality of servo frames recorded on the storage medium; first calculating including calculating an offtrack amount corresponding to a next servo frame, which is a servo frame present next to a data-writing-complete servo frame for which the head has completed data writing, based on the offtrack amounts stored in the storage unit; and determining, based on the offtrack amount of the next servo frame calculated by the calculating unit, whether the data needs to be rewritten in a sector located before the next servo frame.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
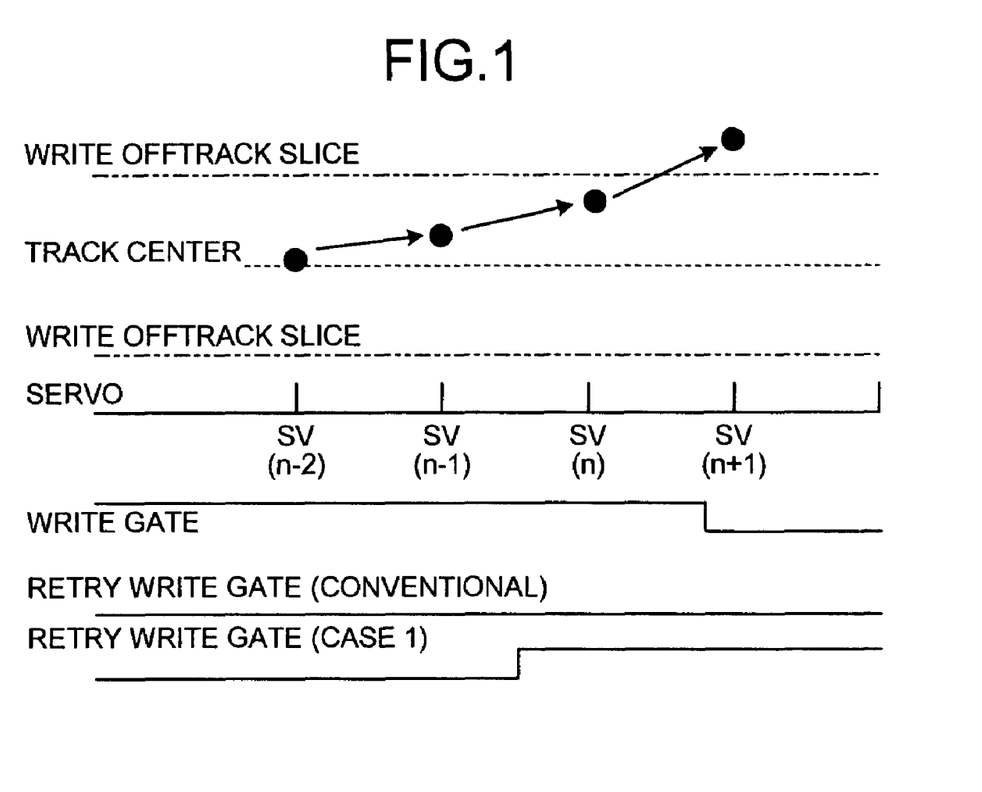
FIG. 1 is a schematic for explaining an overview and a salient feature of a magnetic disk apparatus according to an embodiment of the present invention.

Exemplary embodiments of the present invention will be explained hereinafter with reference to the accompanying drawings. FIG. 1 is a schematic for explaining an overview and a salient feature of a magnetic disk apparatus according to an embodiment of the present invention. The conventional magnetic disk apparatus detects an offtrack amount, i.e., an amount of shift of a head from a track center for each of servo frames recorded at regular intervals on the magnetic disk, stops the writing process, and determines whether data rewriting needs to be performed. However, once data writing in the sectors between servo frames SV(n) and SV(n+1) shown in FIG. 1 is completed, data is not rewritten in these sectors unless a write fault occurs at the servo frame SV(n), that is, unless the offtrack amount at the servo frame SV(n) is equal to or greater than a first stipulated value. The first stipulated value is, for example, a distance between the track center and an end of a write offtrack slice shown in FIGS. 1, 3, and 4.

In other words, depending on the offtrack position of the head after the head has transited the servo frame SV(n), there is a possibility of occurrence of a write fault in the sectors between the servo frames SV(n) and SV(n+1), that is, in the sectors in which the data writing process has been completed. This can potentially lead to a read error, that is, inability to accurately read data in the future.

Considering the conventional disadvantages, the magnetic disk apparatus according to the embodiment acquires the offtrack amount at the next servo frame present in the path of the head ahead of the sectors in which the data writing process has been completed, and determines whether data needs to be rewritten in the sectors where data has been written.

Thus, the magnetic disk apparatus according to the embodiment performs data writing in a proper manner by determining whether data needs to be rewritten even in the sectors where data writing has been completed, exhibiting improved performance.

Figure 2:
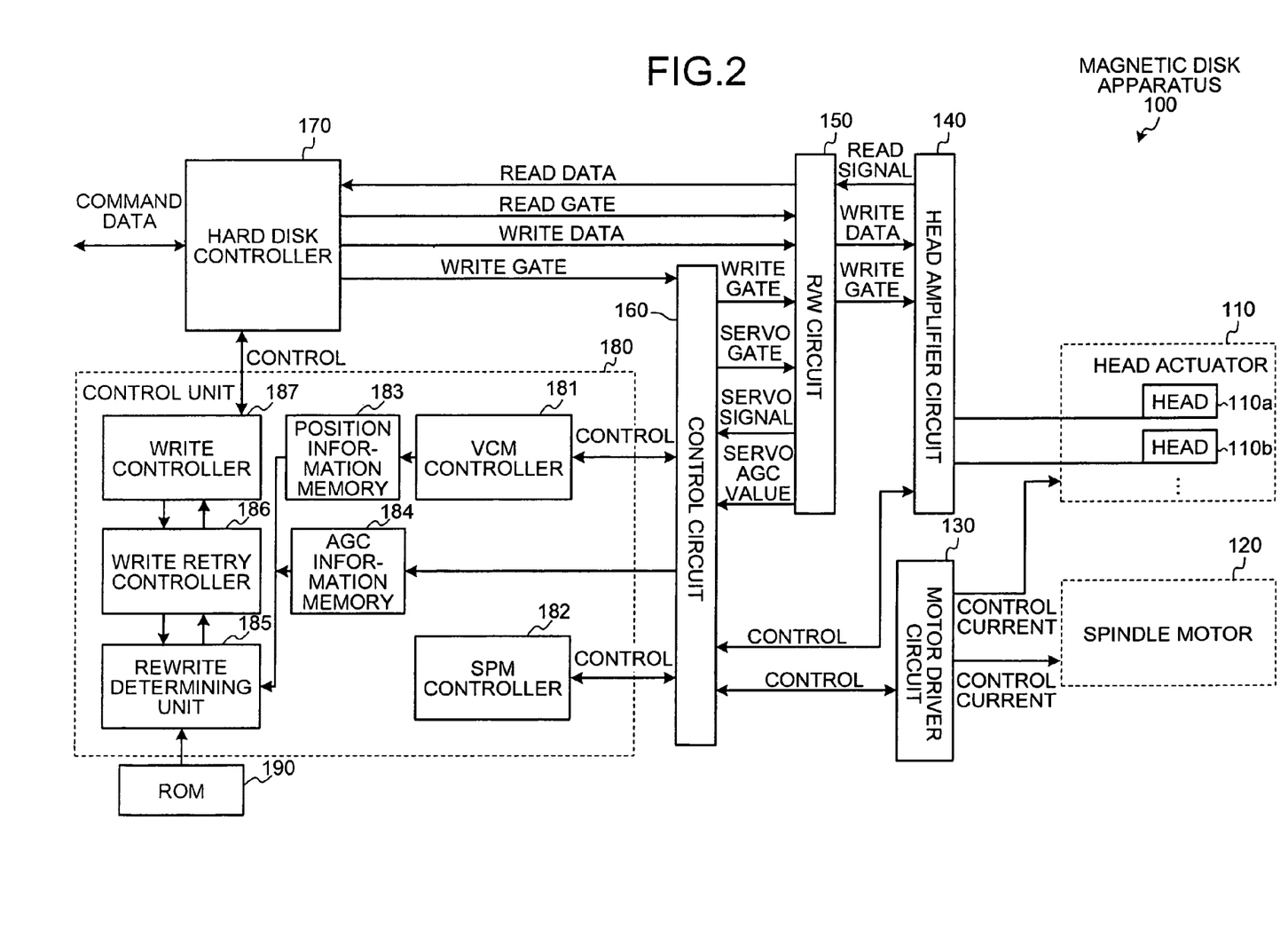
FIG. 2 is a functional block diagram of the magnetic disk apparatus shown in FIG. 1.

A configuration of a magnetic disk apparatus 100 according to the embodiment will be explained with reference to a functional block diagram shown in FIG. 2. The magnetic disk apparatus 100 includes a head actuator 110, a spindle motor 120, a motor driver circuit 130, a head amplifier circuit 140, a read/write (R/W) circuit 150, a control circuit 160, a hard disk controller 170, a control unit 180, and a read-only memory (ROM) 190.

The head actuator 110 actuates, i.e., "moves" heads 110*a* and 110*b* by a control current output from the motor driver circuit 130. Only two heads 110*a* and 110*b* are shown in FIG. 1 for the sake of convenience; however, generally there may be more than two heads.

The spindle motor 120 performs rotation control of the magnetic disk by a control current output from the motor driver circuit 130. The motor driver circuit 130 acquires a control instruction output from the control circuit 160 and outputs the control current to the head actuator 110 and the spindle motor 120 based on the control instruction.

The head amplifier circuit 140 acquires a control instruction from the control circuit 160, and also acquires write data (data to be written onto the magnetic disk) and write gate, i.e., data indicating a write timing for writing the data onto the magnetic disk from the R/W circuit 150. The head amplifier circuit 140 then writes the write data onto the magnetic disk via the head 110*a* or 110*b*. Moreover, the head amplifier circuit 140 acquires a read signal, i.e., data read from the magnetic disk via the head 110*a* or 110*b* and outputs the read signal to the R/W circuit 150.

The R/W circuit 150 performs various processes related to reading of data from and writing of data to the magnetic disk. Specifically, the R/W circuit 150 creates read data (having a constant output level) by amplifying the read signal output from the head amplifier circuit 140 and outputs the read data to the hard disk controller 170 according to read gate, i.e., data indicating a read timing for reading data from the magnetic disk output from the head disk controller 170. In addition, the R/W circuit 150 outputs the write data output from the hard disk controller 170 and the write gate output from the control circuit 160 to the head amplifier circuit 140.

Further, the R/W circuit 150 acquires servo gate, i.e., data indicating a read timing for reading a servo signal from the magnetic disk from, the control circuit 160 and outputs the servo signal to the control circuit 160. Though not shown in FIG. 2, the R/W circuit 150 acquires the servo signal via the head 110*a* or 110*b* and the head amplifier circuit 140 and outputs the servo signal to the control circuit 160. The servo signal contains information on the offtrack amount that indicates the amount of shift of the head 110*a* or 110*b* from the center of the track on the magnetic disk for each servo frame.

The R/W circuit 150 also outputs an amplification degree (a gain of the R/W circuit 150), by which each read signal is amplified, as a servo automatic gain control (AGC) value to the control circuit 160. The R/W circuit 150 adjusts the amplification degree so that the output level of the read data is maintained constant. Consequently, the R/W circuit 150 outputs a larger servo AGC value as the read signal gets smaller, and vice versa. As explained with reference to FIG. 1, the area where a servo automatic gain control (AGC) value overshoots the determination slice is taken the area where the levitation amount of the head is considered to be unstable.

The control circuit 160 controls the motor driver circuit 130 and the head amplifier circuit 140 according to the control instruction from the control unit 180. The control circuit 160 acquires the write gate from the hard disk controller 170 and outputs the write gate to the R/W circuit 150. The control circuit 160 also outputs the servo gate to the R/W circuit 150, acquires the servo signal and the servo AGC value from the R/W circuit 150, and outputs the servo signal and the servo AGC value to the control unit 180.

The hard disk controller 170 receives various types of data/commands from a host computer, which is not shown, or from the control unit 180, and controls the entire magnetic disk apparatus 100 accordingly. In particular relevance to the present invention, in response to a write command from the host computer, the hard disk controller 170 outputs the write gate to the control circuit 160 and the write data to the R/W circuit 150. Similarly, in response to a read command from the host computer, the hard disk controller 170 outputs the read gate to the R/W circuit 150 and the read data acquired from the R/W circuit to the host computer.

Further, in response to a write retry command from the control unit 180, the hard disk controller 170 outputs to the R/W circuit 150 the write data to be rewritten to the sectors on the magnetic disk determined by the control unit 180, and outputs the write gate to the control circuit 160.

The control unit 180 has an internal memory for storing therein various types of control data and uses the data to perform various processes. In particular relevance to the present invention, the control unit 180, as shown in FIG. 2, includes a voice coil motor (VCM) controller 181, a spindle motor (SPM) controller 182, a position information memory 183, an AGC information memory 184, a rewrite determining unit 185, a write retry controller 186, and a write controller 187.

The VCM controller 181 acquires the servo signal from the control circuit 160, and outputs, based on the servo signal, a control instruction to the control circuit 160 to move the head 110a or 110b to the track on the magnetic disk from which data is to be read or to which data is to be written. The VCM controller 181 stores the servo signal acquired from the control circuit 160 in the position information memory 183.

The SPM controller 182 outputs to the control circuit 160 a control instruction for adjusting the number of rotations of the spindle motor 120. The position information memory 183 stores therein the servo signal that contains the offtrack amount for every servo frame. The servo signal is stored in the position information memory 183 by the VCM controller 181. The AGC information memory 184 stores therein the servo AGC value output from the control circuit 160 for every servo frame.

The rewrite determining unit 185 determines whether data is to be rewritten based on the servo signal stored in the position information memory 183, and if data is to rewritten, determines the rewrite sector count based on the servo signal and the servo AGC value stored in the AGC information memory 184. The rewrite determining unit 185 also determines whether data is to be rewritten in the sectors in which data writing has been completed if it acquires, via the write retry controller 186, a determination request from the write controller 187 to determine whether data is to be rewritten in the sectors in which data writing has been completed.

A normal determination process by which the rewrite determining unit 185 determines whether data is to be rewritten in the sectors in which data writing has been completed without the acquisition of the determination request from the write controller 187 will be explained first. A request-based determination process performed by the rewrite determining unit 185 following the acquisition of the determination request from the write controller 187 will next be explained.

In the normal determination process, the rewrite determining unit 185 performs a first determination process, a second determination process, and a third determination process. In the first determination process, the rewrite determining unit 185 determines the rewrite sector count based on the offtrack amount for every servo frame. In the second determination process, the rewrite determining unit 185 determines the rewrite sector count when the offset amount at the next servo frame in the path of the head is estimated and the writing process stops. In the third determination process, the rewrite determining unit 185 determines the rewrite sector count based on the servo AGC value. The rewrite determining unit 185 then compares the results of the first, second, and third determination processes, and selects the highest rewrite sector count as the rewrite sector count. The first, second, and third determination processes are explained below in detail.

Figure 3:
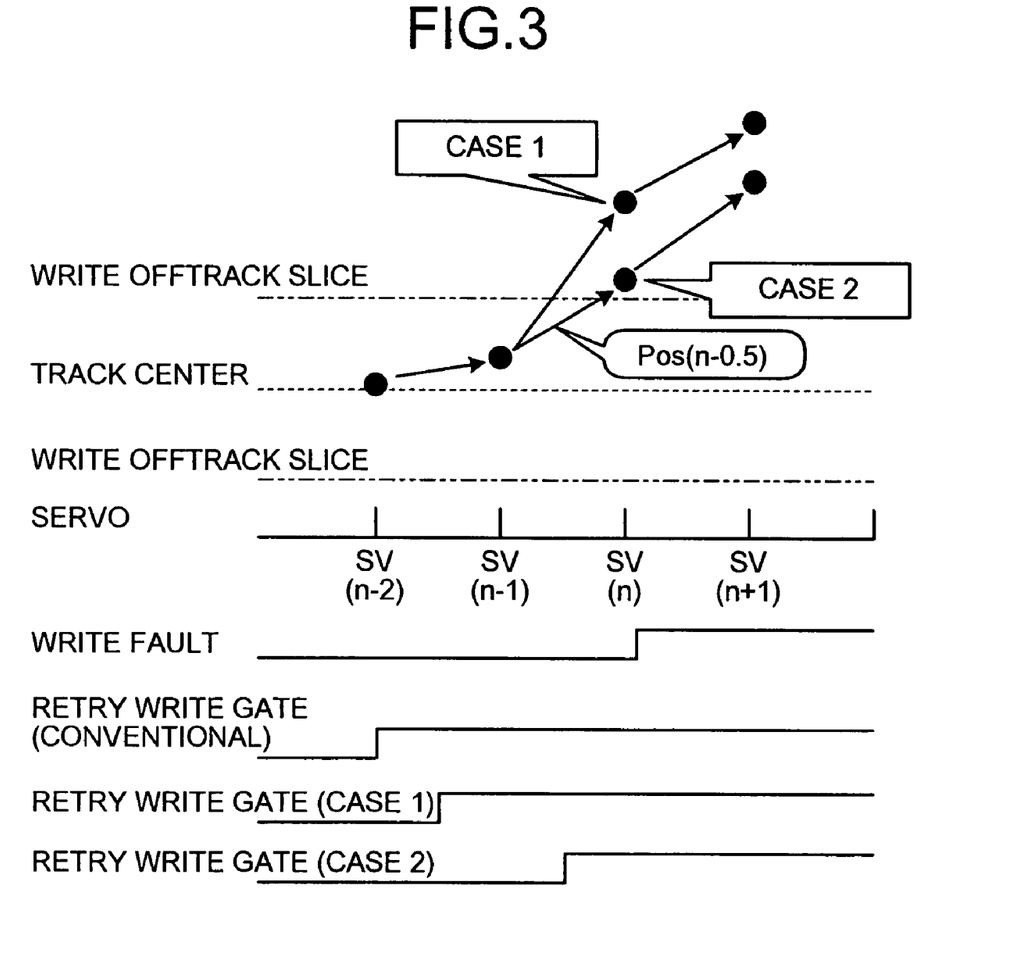
FIG. 3 is a schematic for explaining a first determination process.

FIG. 3 is a schematic for explaining the first determination process. The rewrite determining unit 185 acquires the servo signal stored in the position information memory 183 and determines for every servo frame whether the offtrack amount is equal to or greater than a first stipulated value. It is to be noted that the first stipulated value is defined as a distance between the track center and one end of the write offtrack slice in FIGS. 1, 3 and 4. The rewrite determining unit 185 determines that the data is to be rewritten if the offtrack amount is equal to or greater than the stipulated value.

After determining that the data is to rewritten, the rewrite determining unit 185 determines the rewrite sector count. The example in FIG. 3 depicts a case of the offtrack amount exceeding the first stipulated value at the servo frame SV(n), indicating that a write fault has occurred at the servo frame SV(n).

In Case 1 shown in FIG. 3, the offtrack amount at the servo frame SV(n) has grossly exceeded the first stipulated value, the rewrite determining unit 185 determines that data needs to be rewritten in the sectors that include the servo frame SV(n−1), that is, all the sectors between the servo frames SV(n−1) and SV(n). Let us assume that the rewrite determining unit 185 determines that the rewrite sector count is five.

In Case 2 shown in FIG. 3, the offtrack amount at the servo frame SV(n) has only marginally exceeded the first stipulated value. This indicates that the offtrack amount immediately after the servo frame SV(n−1) is negligible, and there is no need to rewrite data in the sectors immediately after the servo frame SV(n−1). Thus, in Case 2, the rewrite determining unit 185 determines that it is necessary to rewrite data in not all but only some of the sectors between the servo frames SV(n−1) and SV(n). For example, the rewrite determining unit 185 determines that it is necessary to rewrite data in only four out of the five sectors between the servo frames SV(n−1) and SV(n).

A method of classifying a write fault as Case 1 or Case 2 is explained below. The rewrite determining unit 185 sets the offtrack amount at the servo track SV(n) as Pos(n) and calculates, by linear interpolation, an offtrack amount halfway between the servo tracks SV(n−1) and SV(n) as Pos(n−0.5). The rewrite determining unit 185 classifies the write fault as Case 1 or Case 2 based on the offtrack amount calculated by the linear interpolation.

An equation for calculating the Pos(n−0.5) by the linear interpolation is Pos(n−0.5)=(Pos(n)−Pos(n−1)/2)+Pos(n−1)).

If the value of Pos(n−0.5) is equal to or greater than the first stipulated value, the rewrite determining unit 185 takes it indicating that the offtrack amount of the data written immediately after the servo track SV(n−1) is large, and hence classifies the write fault as Case 1.

If the value of Pos(n−0.5) is smaller than the first stipulated value, the rewrite determining unit 185 takes it indicating that the offtrack amount of the data written immediately after the servo track SV(n−1) is small, and hence classifies the write fault as Case 2.

Figure 4:
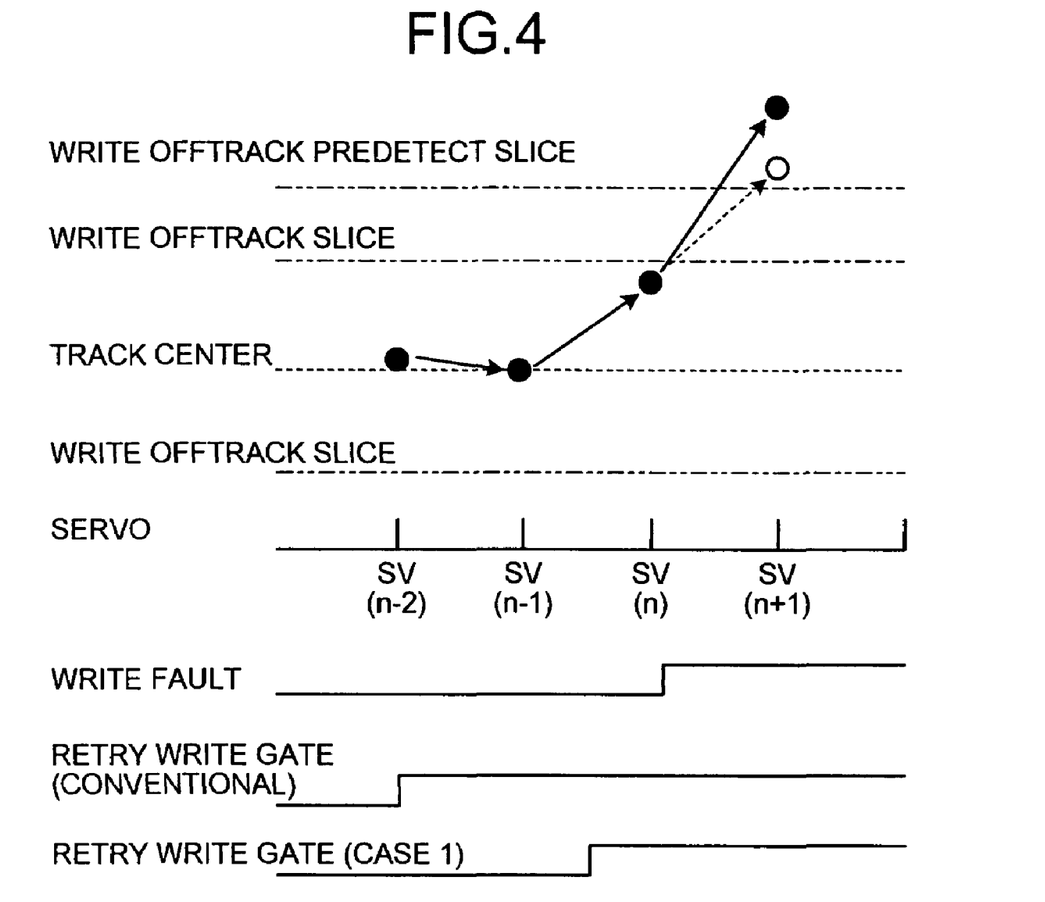
FIG. 4 is a schematic for explaining a second determination process.

The second determination process is described below. FIG. 4 is a schematic for explaining the second determination process. In the second determination process, the rewrite determining unit 185 calculates, i.e., 'estimates' an offtrack amount at the next servo frame based on the servo signal recorded in the position information memory 183, and determines whether the calculated offtrack amount is greater than a second stipulated value. It is to be noted that the second stipulated value is defined as a distance between the track center and an end of a write offtrack predetect slice in FIG. 4. If the offtrack amount is greater than the stipulated value, the writing process stops and the rewrite determining unit 185 determines that data rewriting should be performed.

If SV(n) is the current servo frame, the servo frame at which an offtrack amount is to be estimated would be SV(n+1). An equation used for calculating the offtrack amount at the next servo frame can, for instance, be SV(n+1)=SV(n)+(SV(n)−SV(n−1)).

If determining in the second determination process that rewriting is to be performed, the rewrite determining unit 185 determines rewriting is to be performed beginning from a sector in which data is written immediately after the current servo frame. If the current servo frame is SV(n), the rewrite determining unit 185 determines that rewriting should be performed from the sector immediately after the servo frame SV(n). Let us assume that the rewrite determining unit 185 determines that the rewrite sector count is two or one.

Apart from using the equation, an estimate can be made of the head position by an observer for estimating the offtrack amount at the next servo frame, after which it can be determined whether rewriting is to be performed.

The third determination process is explained below with reference to FIG. 1. In the third determination process, the rewrite determining unit 185 acquires the servo signal stored in the position information memory 183 and determines whether the offtrack amount is equal to or greater than the first stipulated value. The rewrite determining unit 185 determines that rewriting is to be performed if the offtrack amount is equal to or greater than the first stipulated value.

Figure 5:
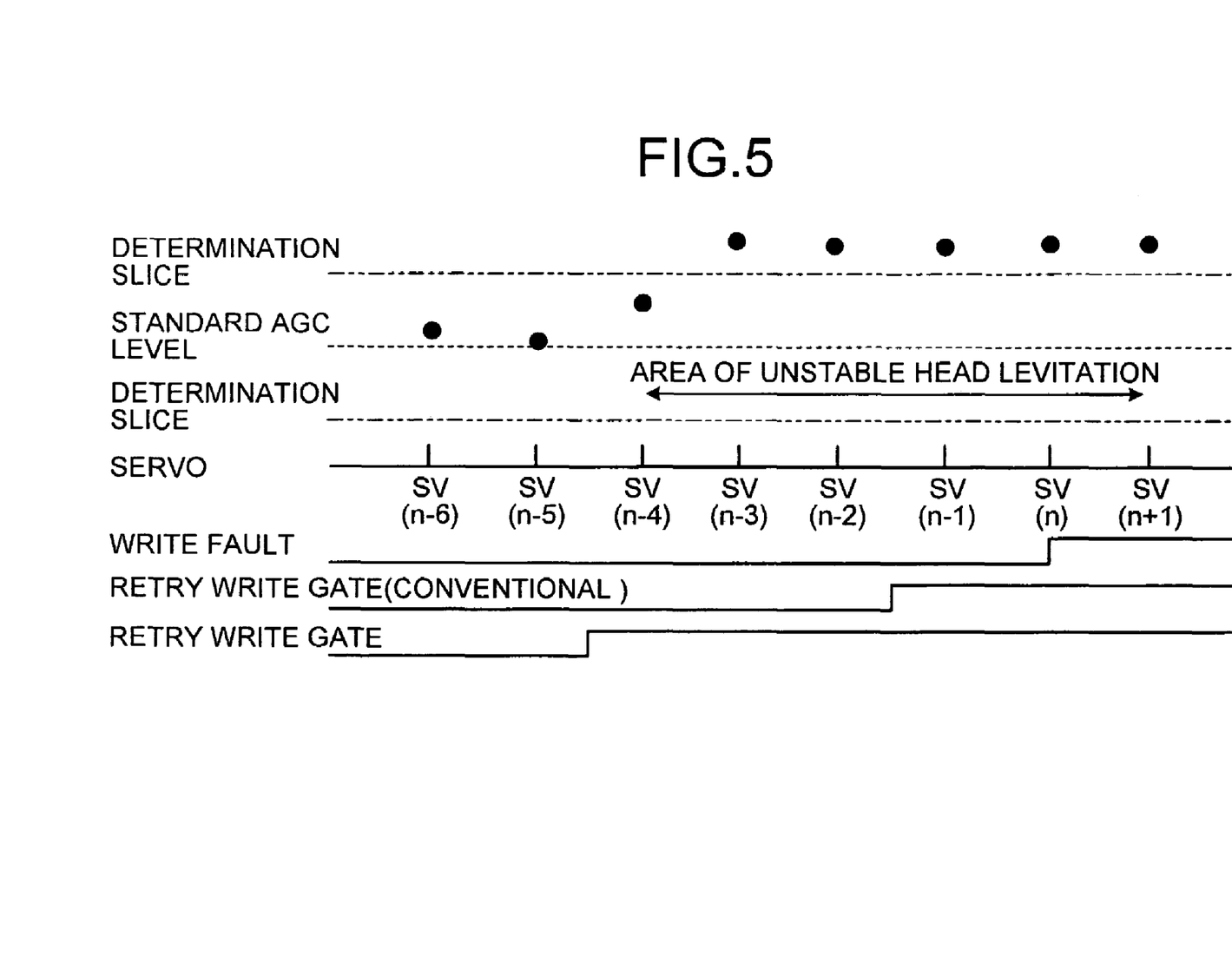
FIG. 5 is a schematic for explaining a third determination process.

Upon determining that rewriting is to be performed in the third determination process, the rewrite determining unit 185 determines the rewrite sector count based on the servo AGC value stored in the AGC information memory 184. As shown in FIG. 5, the rewrite determining unit 185 determines a servo frame, i.e., servo frame SV(n−4) where the servo AGC value is equal to or smaller than a third stipulated value. The third stipulated value is, for example, a distance between a standard AGC level and an end of the determination slice shown in FIG. 5.

The rewrite determining unit 185 then determines the rewrite sector count to include at least the servo frame where the servo AGC value is equal to or smaller than the third stipulated value. The rewrite sector count N, for instance, is calculated by an equation N=(T1−T2)*A+C . . . , where T1 is the number of the servo frame at which a write fault has occurred, i.e., the number of the servo frame SV(n) in the example shown in FIG. 1, T2 is the number of the servo frame where the servo AGC value is equal to or smaller than the third stipulated value, i.e., the number of the servo frame SV(n−1) in the example shown in FIG. 1, A is the number of sectors between two servo frames, and C is a constant. The equation given above is only an example. The constant C can be omitted.

Apart from determining the rewrite sector count using the first and second determination processes when a write fault occurs, the rewrite determining unit 185 also determines the rewrite sector count based on the cause for interruption to the writing process. The rewrite determining unit 185, for example, determines the cause of the write fault based on a shock signal output from the shock sensor when the magnetic disk apparatus 100 receives a jolt, or circuit information regarding a fault in a circuit such as amplifier information that indicates any fault in the head amplifier circuit 140, and determines the rewrite sector count based on the cause of the write fault. For example, if the magnetic disk apparatus 100 receives a jolt and the head amplifier circuit 140 thereby malfunctions, that is, if the write fault is caused by a jolt to the magnetic disk apparatus 100 as well as a malfunctioning of the head amplifier circuit 140, the rewrite determining unit 185 determines that data in two sectors needs to be rewritten. However, if only one condition occurs, that is, either the magnetic disk apparatus 100 receives a jolt or the head amplifier circuit 140 malfunctions, the rewrite determining unit 185 determines that data in one sector needs to be rewritten.

Thus, the rewrite sector count can be determined more accurately by determining the cause of the write fault garnered from the shock signal from the shock sensor and amplifier information from the head amplifier circuit 140.

The request-based determination process performed by the rewrite determining unit 185 following the acquisition of the determination request from the write controller 187 is explained below.

In the request-based determination process, the rewrite determining unit 185 detects from the position information memory 183 the offtrack amount corresponding to the next servo frame in the path of the head ahead of the sectors in which the data writing process has been completed and determines whether the offtrack amount is equal to or greater than the first stipulated value. If the offtrack amount is equal to or greater than the first stipulated value, the rewrite determining unit 185 determines that data is to be rewritten in the sectors in which data writing has been completed.

The request-based determination process performed by the rewrite determining unit 185 is explained in detail with reference to FIG. 1. If data writing is completed in the sectors between the servo frames SV(n) and SV(n+1), the rewrite determining unit 185 detects the offtrack amount corresponding to the servo frame SV(n+1) from the position information memory 183, and compares the offtrack amount with the first stipulated value. If the offtrack amount is equal to or greater than the first stipulated value, the rewrite determining unit 185 determines that data rewriting is to be performed in the sectors in which data writing has been completed.

Upon determining in the request-based determination process that rewriting is to be performed, the rewrite determining unit 185 determines the rewrite sector count and outputs the rewrite sector count to the write controller 187. The rewrite determining unit 185 determines the rewrite sector counts by the first and the third determination processes, compares the two rewrite sector counts determined in the first and second determination processes, and selects the larger rewrite sector count as the rewrite sector count. Data rewriting is performed in as many sectors as the rewrite sector count before the sector up to which data writing has been completed.

When using the first determination process, the rewrite determining unit 185 reads from the position information memory 183 the offtrack amounts corresponding to the servo frames SV(n) and SV(n+1) shown in FIG. 1, respectively, calculates the offtrack amount halfway between the servo frames SV(n) and SV(n+1) by linear interpolation, and classifies the write fault as Case 1 or Case 2 based on the offtrack amount calculated by the linear interpolation (if data writing has been completed in the sectors between the servo frames SV(n) and SV(n+1)).

If the write fault is determined as Case 1 based on the offtrack amount calculated by the linear interpolation, the rewrite determining unit 185 determines that rewriting is to be performed from the fifth sector before the sector up to which data writing has been completed, that is, the rewrite determining unit 185 determines that the rewrite sector count is four.

On the other hand, if the write fault is determined as Case 2, the rewrite determining unit 185 determines that rewriting is to be performed from the fourth sector before the sector up to which data writing has been completed, that is, the rewrite determining unit 185 determines that the rewrite sector count is two.

When using the third determination process, the rewrite determining unit 185 detects from the AGC information memory 184 the servo AGC values corresponding to the servo frames before the servo frame SV(n+1) shown in FIG. 1, and identifies the servo frame where the servo AGC value is equal to or smaller than the third stipulated value (see FIG. 5).

The rewrite determining unit 185 then determines the rewrite sector count to include at least the servo frame where the servo AGC value is equal to or smaller than the third stipulated value. The equation used for calculating the rewrite sector count is similar to the one explained with reference to the normal determination process.

If the writing process has been completed in the sectors between the servo frames SV(n) and SV(n+1), the rewrite determining unit 185, apart from determining whether data is to be rewritten based on the offtrack amount corresponding to the servo frame SV(n+1), can also determine whether data is to be rewritten in the sectors in which data writing has been completed based on the servo AGC value corresponding to the servo frame SV(n+1).

Returning to FIG. 2, the write retry controller 186 inquires the rewrite determining unit 185 whether rewriting is to be performed. If the rewrite determining unit 185 determines that rewriting is to be performed, the write retry controller 186 acquires from the rewrite determining unit 185 the rewrite sector count and outputs the rewrite sector count as a retry condition to the write controller 187.

The write controller 187 outputs the retry condition to the hard disk controller 170 during the rewriting process, enabling write retry to take place. Specifically, when the write retry controller 186 outputs the inquiry regarding whether rewriting is to be performed to the rewrite determining unit 185 and the write controller 187 acquires the retry condition from the write retry controller 186, the write controller 187 determines that write retry is to be performed and outputs the retry condition to the hard disk controller 170.

After data writing is completed in the sectors in which data writing has been completed, the write controller 187 outputs to the rewrite determining unit 185 the request to determine whether data rewriting needs to be performed in the sectors. If the rewrite determining unit determines that data needs to be rewritten, the write controller 187 receives the rewrite sector count output by the rewrite determining unit 185, and performs data rewriting based on the rewrite sector count, that is, performs data rewriting in as many sectors as the rewrite sector count before the sector up to which data writing has been completed.

The ROM 190 stores therein the data and programs required by the control unit 180 for performing various processes.

Figure 6:
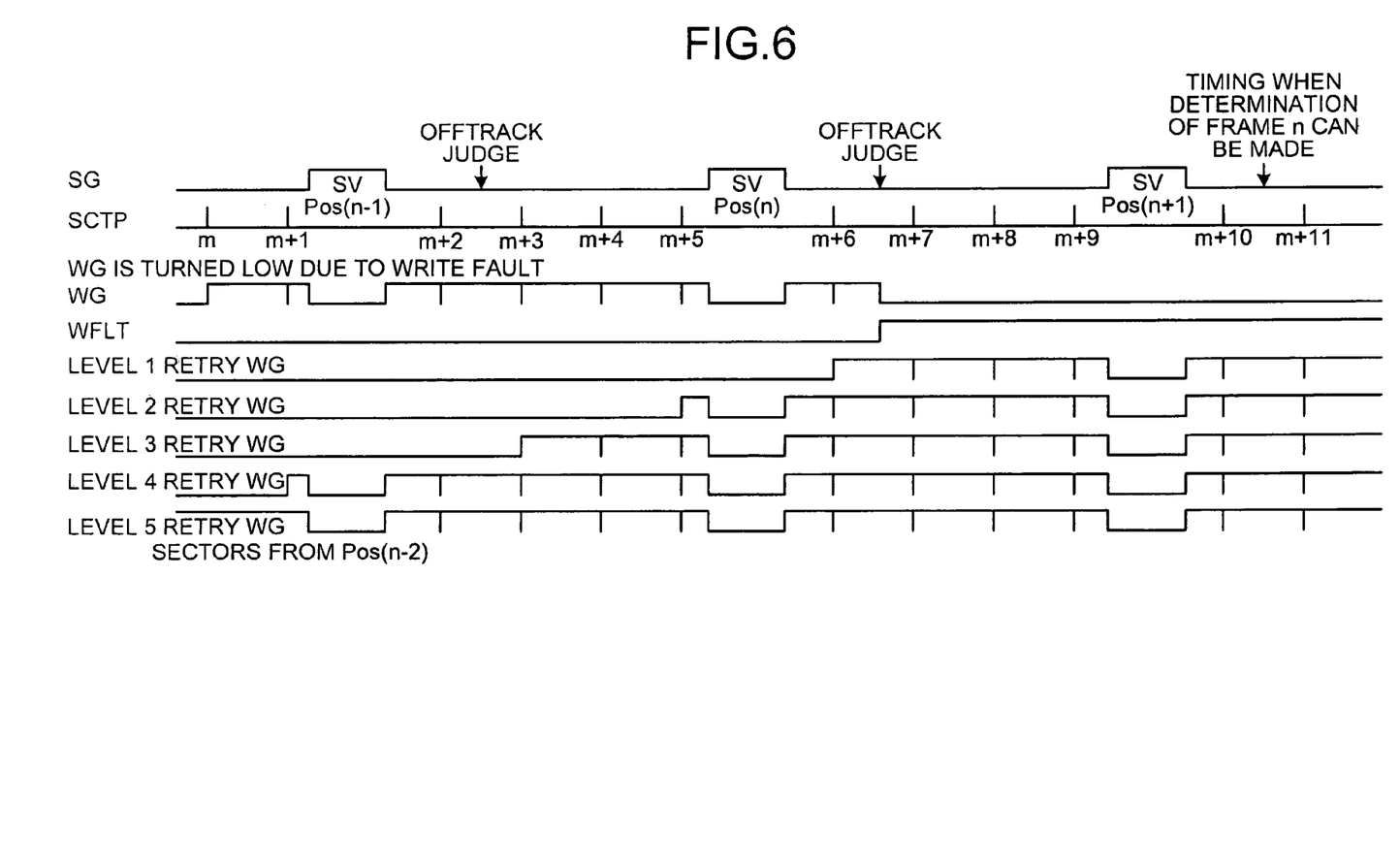
FIG. 6 is an example of timings of write gate and servo frames for different rewrite sector counts.

FIG. 6 is an example of the write gate and the timings of the servo frames for different rewrite sector counts. Symbol SG in the first row in FIG. 6 indicates the servo gate, and when the value of the servo gate is high, the head is on the servo frame. A timing of the SG labeled Offtrack judge is when it is determined whether a write fault has occurred. When the SG is high, it acts as a trigger for the Offtrack judge to be performed.

Symbol SCTP in the second row in FIG. 6 indicates the sectors on the magnetic disk. Symbol WG in the third row indicates the write gate. Symbol WFLT in the fourth row indicates the timing of the write fault. In the example shown in FIG. 6, the write fault occurs between SCTP m+6 and m+7.

Level 1 retry WG to Level 5 retry WG in FIG. 6 indicate write gate signals for the respective rewrite sector counts. Level 1 retry WG is the write gate signal when the rewrite sector count is one, and in the example shown in FIG. 5, rewriting is performed from SCTP m+6. Level 2 retry WG is the write gate signal when the rewrite sector count is two, and in FIG. 6, rewriting is performed from SCTP m+5. Level 3 retry WG is the write gate signal when the rewrite sector count is four, and in FIG. 6, rewriting is performed from SCTP m+3.

Level 4 retry WG is the write gate signal when the rewrite sector count is five, and in FIG. 6, rewriting is performed from SCTP m+1. Level 5 retry WG is the write gate signal when the sectors to be rewritten start immediately after Pos(n−2).

The magnetic disk apparatus 100 performs rewriting using the level 4 retry WG if the rewrite determining unit 185 determines in the first determination process (as the normal determination process) that the write fault falls under Case 1, and performs rewriting using the level 3 retry WG if the rewrite determining unit 185 determines that the write fault falls under Case 2.

The magnetic disk apparatus 100 performs rewriting using the level 2 retry WG or the level 1 retry WG if the rewrite determining unit 185 determines in the second determination process (as the normal determination process) that rewriting needs to be performed.

The magnetic disk apparatus 100 adjusts a duration for which retry WG remains 'high' to correspond to the rewrite sector count determined by the rewrite determining unit 185 if the rewrite determining unit 185 determines in the third determination process (as the normal determination process) that rewriting needs to be performed. If the rewrite sector count is eight, the magnetic disk apparatus 100 performs data rewriting by setting the rewrite WG after SCTP m−1 as 'high'.

Conventional magnetic disk apparatuses always perform rewriting using either the level 4 retry WG or the level 5 retry WG. However, in the magnetic disk apparatus according to the embodiment of the present invention, the rewrite sector count varies according to the situation. Therefore, sectors in which it is unnecessary to rewrite data are left alone, preventing performance deterioration of the magnetic disk apparatus 100.

Because the duration for which retry WG remains high is adjusted taking into account the variation in the levitation amount of the head, the possibility of leaving data writing in an unstable manner unaddressed is eliminated.

Figure 7:
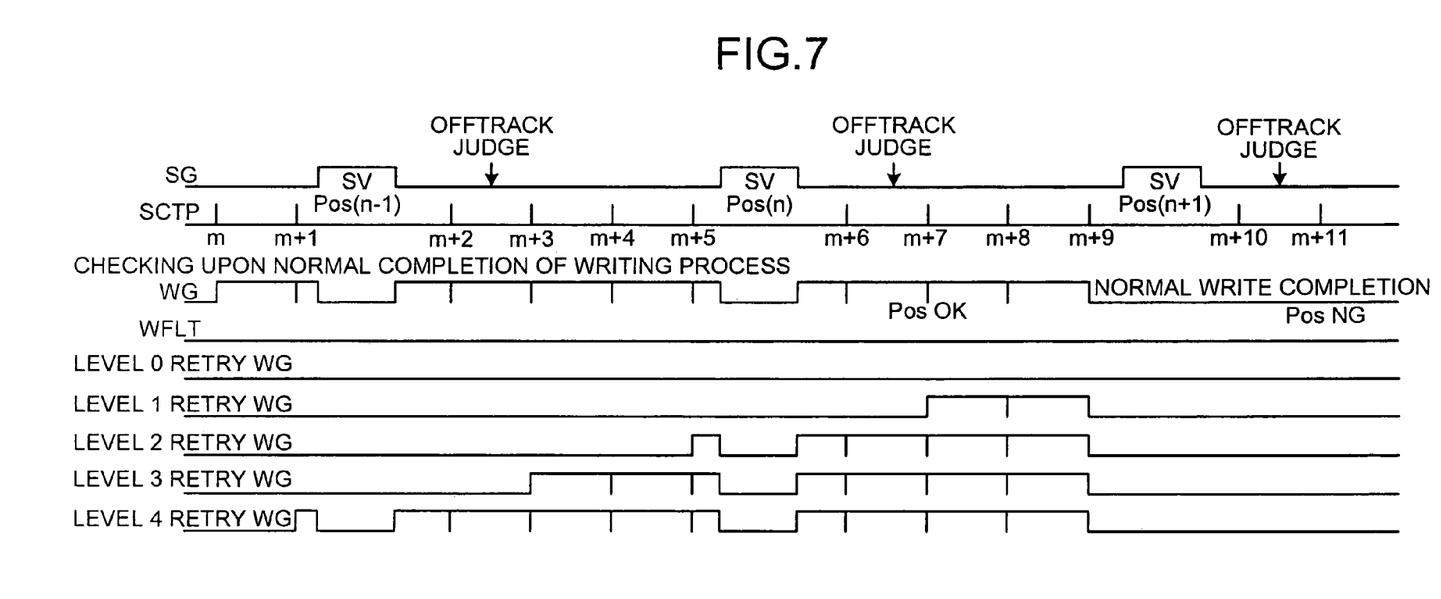
FIG. 7 is an example of timings of the write gate and servo frames when rewriting data in sectors in which data writing has been completed.

FIG. 7 is an example of the timings of the write gate and the servo frames when rewriting data in the sectors in which data writing has been completed. Because symbols SG, SCTP, WG, WFLT in FIG. 7 represent the same as those in FIG. 6, they will not be explained herein. In FIG. 7, data writing process has been normally completed at SCTP m+9.

Level 0 retry WG in FIG. 7 indicates a write gate signal for the condition when no retries are performed (the signal is constantly 'low'). Level 1 retry WG to Level 5 retry WG in FIG. 7 indicate the write gate signals for the respective rewrite sector counts. Level 1 retry WG indicates a write gate signal for the condition when the rewrite sector count is two (in the example shown in FIG. 7, rewriting is performed from two sectors before SCTP m+9 where data writing is completed, that is, from SCTP m+7 to SCTP m+9). Level 2 retry WG indicates a write gate signal for the condition when the rewrite sector count is four (in FIG. 7, rewriting is performed from four sectors before SCTP m+9 where data writing is completed, that is, from SCTP m+5 to SCTP m+9).

Level 3 retry WG indicates a write gate signal for the condition when the rewrite sector count is six (in FIG. 7, rewriting is performed from six sectors before SCTP m+9 where data writing is completed, that is, from SCTP m+3 to SCTP m+9). Level 4 retry WG indicates a write gate signal for the condition when the rewrite sector count is eight.

The magnetic disk apparatus 100 performs rewriting using the level 2 retry WG signal if the rewrite determining unit 185 determines in the first determination process (as the request-based determination process) that the write fault falls under Case 1, and performs rewriting using the level 1 retry WG signal if the rewrite determining unit 185 determines that the write fault falls under Case 2.

The magnetic disk apparatus 100 adjusts the duration for which retry WG remains high to correspond to the rewrite sector count determined by the rewrite determining unit 185 if the rewrite determining unit 185 determines in the third determination process (as the request-based determination process) that data needs to be rewritten. If the rewrite sector count is ten, the magnetic disk apparatus 100 sets the retry WG from SCTP m−1 to SCTP m+9 to high so that the rewrite sector count up to SCTP m+9 (the sector up to which writing has been completed) is ten.

Figure 8:
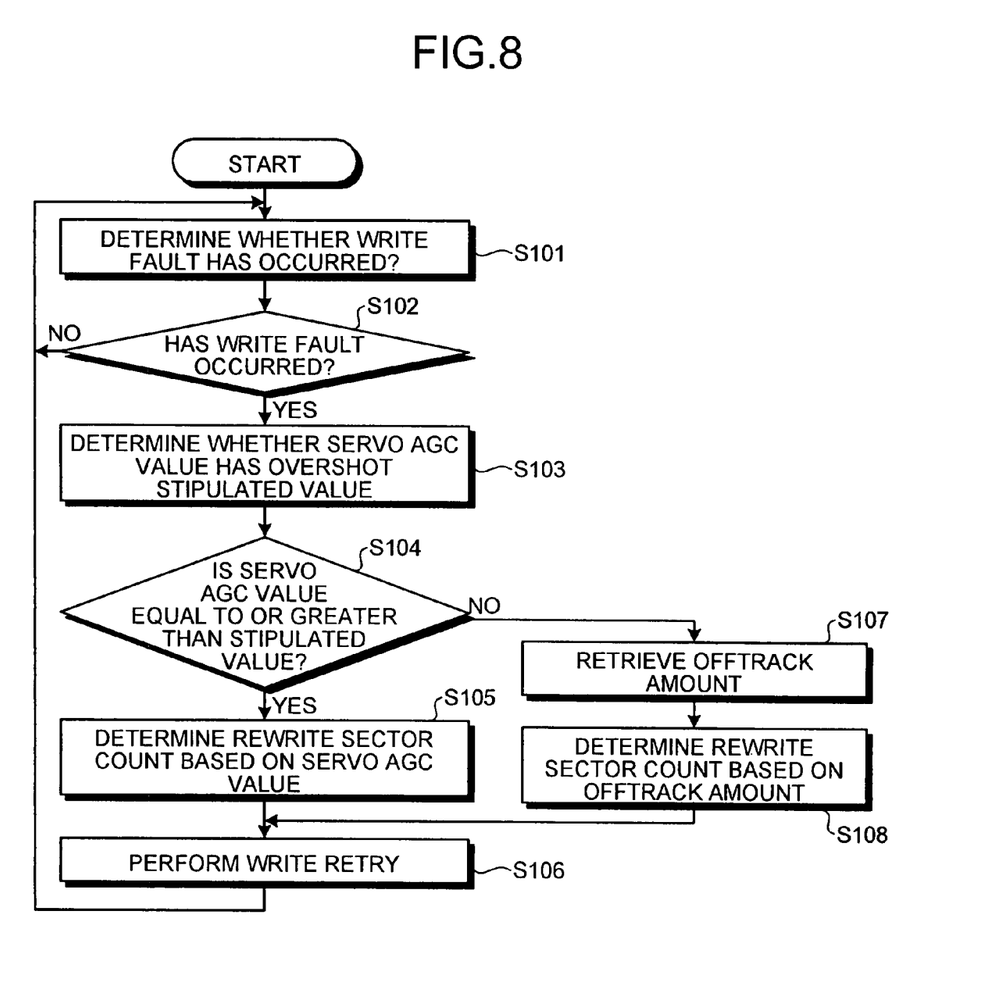
FIG. 8 is a flowchart of a process procedure performed by the magnetic disk apparatus for determining a rewrite sector count.

A process procedure of the magnetic disk apparatus 100 for determining the rewrite sector count is explained below with reference to FIG. 8. The rewrite determining unit 185 of the magnetic disk apparatus 100 acquires the servo signal from the position information memory 183 and determines if a write fault has occurred (step S101). If no write fault has occurred (No at step S102), the rewrite determining unit 185 repeats step S101.

If a write fault occurs (Yes at step S102), the rewrite determining unit 185 acquires the servo AGC value from the AGC information memory 184 and determines whether the servo AGC value is equal to or greater than the third stipulated value (step S103).

If the servo AGC value is equal to or greater than the third stipulated value (Yes at step S104), the rewrite determining unit 185 determines the rewrite sector count based on the servo AGC value (step S105). The write controller 187 acquires the rewrite sector count from the rewrite determining unit 185 via the write retry controller 186, and performs write retry (step S106).

If the servo AGC value is smaller than the third stipulated value (No at step S104), the rewrite determining unit 185 acquires the offtrack amount corresponding to each servo frame from the position information memory 183 (step S107), determines the rewrite sector count (step S108), and returns to the step S106.

The rewrite determining unit 185 performs either the first determination process or the second determination process at the step S108 to determine the rewrite sector count.

In the rewrite sector count determining process explained with reference to FIG. 8, the rewrite determining unit 185 performs either the first determination process, or the second determination, or the third determination process. However, the rewrite determining unit 185 can be configured to perform all the three determination processes sequentially, and select the highest of the rewrite sector counts as the rewrite sector count.

Thus, when a write fault occurs, the rewrite determining unit 185 determines the rewrite sector count and the write controller 187 performs rewriting. Consequently, inclusion of unstably written data in the magnetic disk at the time of completion of the writing process is prevented.

Figure 9:
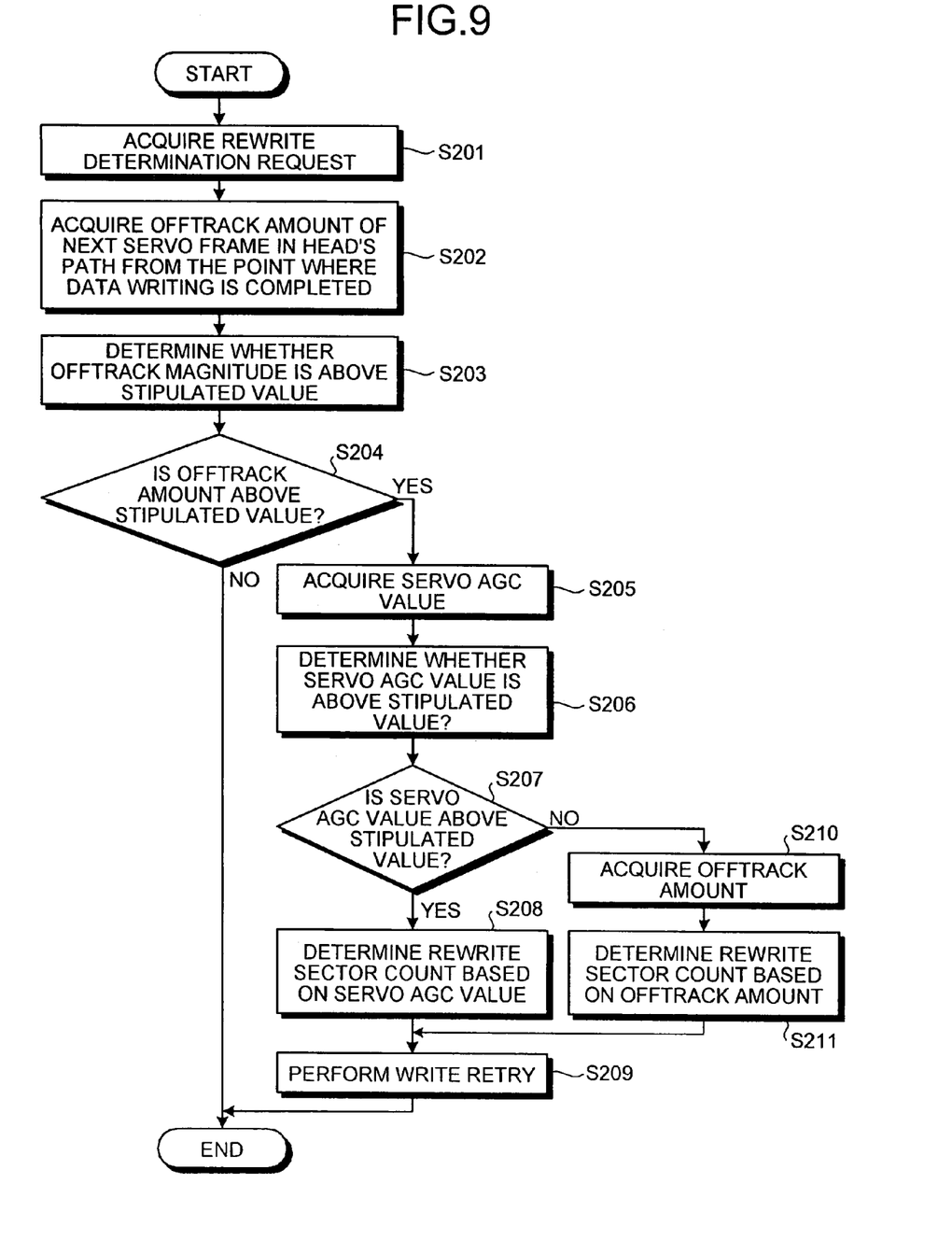
FIG. 9 is a flowchart of a data rewriting process procedure performed by the magnetic disk apparatus after data writing has been completed.

A data rewriting process procedure of the magnetic disk apparatus 100 after completion of data writing is explained below. FIG. 9 is a flowchart of the data rewriting process procedure of the magnetic disk apparatus 100.

The rewrite determining unit 185 of the magnetic disk apparatus 100 acquires from the write controller 187 a request to determine whether data rewriting is to be performed in the sectors in which data writing has been completed (step S201). The rewrite determining unit 185 acquires from the position information memory 183 the offtrack amount corresponding to the next servo frame in the path of the head from the point where up to which data writing has been completed (step S202).

If the rewrite determining unit 185 determines whether the offtrack amount is equal to or greater than the first stipulated value (step S203), and if the offtrack amount is below the first stipulated value (No at step S204), the magnetic disk apparatus 100 ends the process.

If the offtrack amount is equal to or greater than the first stipulated value (Yes at step S204), the rewrite determining unit 185 acquires from the AGC information memory 184 the servo AGC value corresponding to the servo frame before the servo frame up to which data writing has been completed (step S205). Furthermore, the rewrite determining unit 185 determines whether the servo AGC value is equal to or greater than the third stipulated value (step S206).

If the servo AGC value is equal to or greater than the third stipulated value (Yes at step S207), the rewrite determining unit 185 determines the rewrite sector count based on the servo AGC value (step S208). The write controller 187 acquires the rewrite sector count from the rewrite determining unit 185 via the write retry controller 186 and performs write retry (step S209).

If the servo AGC value is below the third stipulated value (No at step S207), the rewrite determining unit 185 acquires the offtrack amount corresponding to every servo frame from the position information memory 183 (step S210), determines the rewrite sector count (step S211), and returns to step S209.

At the step S202 of the flowchart shown in FIG. 9, determination of whether data is to be rewritten can made based on the servo AGC value of the next servo frame in the path of the head from the point up to which writing has been completed instead of on the offtrack amount.

Thus, the rewrite determining unit 185 determines whether data rewriting needs to be performed in the sectors in which data writing is completed. Consequently, data can be written to the magnetic disk more accurately without write faults.

As explained so far, in the magnetic disk apparatus 100 according to the embodiment, upon completion of data writing up to predetermined sectors, the write controller 187 outputs a request to determine whether data rewriting needs to be performed, the rewrite determining unit 185 calculates from the position information memory 183 the offtrack amount corresponding to the next servo frame in the path of the head from the point where data writing has been completed, and determines whether data is to be rewritten based on the offtrack amount. Consequently, data is correctly rewritten in sectors where a write fault has occurred even after the data writing process has been completed.

In the magnetic disk apparatus 100 according to the embodiment, data rewriting is performed by taking into consideration the variation of the head in the radial direction in the form of offtrack amount as well as the variation of the head in the vertical direction in the form of the levitation amount of the head. Consequently, it is possible to ensure rewriting data in all the sectors where write faults have occurred, and a future read error can be prevented.

The various process explained in the embodiment can be realized by execution of a program prepared in advance by a central processing unit (CPU) (or a micro control unit (MCU)

or a micro processing unit (MCU)) provided in the magnetic disk apparatus 100. Programs for executing the various processes shown in FIG. 2 can be stored in the RAM 190, and the processes can be realized by causing the control unit 180 to read the programs from the ROM 190.

The programs need not necessarily be installed in the ROM 190 but can be read by the control unit 180 from a portable physical medium such as flexible disk (FD), compact disk-read-only memory (CD-ROM), digital versatile disk (DVD), a magnetooptical disk or an integrated circuit (IC) card that can be inserted into the host computer. Alternatively, the program can be stored in a non-portable physical medium such as hard disk device (HDD) provided in the host computer internally or externally, or on another computer (or server) connected to the computer over the public line, the Internet, the local area network (LAN), or the wide area network (WAN).

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

All the automatic processes explained in the embodiment can be, entirely or in part, carried out manually. Similarly, all the manual processes explained in the embodiment can be entirely or in part carried out automatically by a well-known method.

The process procedures, the control procedures, specific names, and data, including various parameters mentioned in the description and drawings can be changed as required unless otherwise specified.

The constituent elements of the apparatus illustrated are merely conceptual and may not necessarily physically resemble the structures shown in the drawings. For example, the apparatus need not necessarily have the structure that is illustrated. The apparatus as a whole or in parts can be distributed or integrated either functionally or physically according to the load or how the apparatus is to be used.

The process functions performed by the apparatus are entirely or partially realized by the CPU or a computer program executed by the CPU or by a hardware using wired logic.

According to an aspect of the present invention, data rewriting can be performed accurately, and inclusion of unstably written data in the storage medium can be prevented.

According to another aspect of the present invention, unnecessary rewriting is done away with, the number of sectors in which data is to be rewritten is minimized, and rewriting can be carried out efficiently.

According to still another aspect the present invention, inclusion of unstably written data in the storage medium is prevented when the writing process is completed.

According to an aspect of the present invention, inclusion of unstably written data in the storage medium is prevented when the writing process is completed and a future read error can be prevented, enhancing the reliability of the magnetic disk apparatus. Reliability can be particularly improved in portable devices that are likely to be carried when traveling and that are likely to receive jolts, be dropped, or be exposed to variations in atmospheric pressure.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control apparatus that controls a storage apparatus to rewrite data when a write fault occurs while the data is being written to a storage medium included in the storage apparatus, the control apparatus comprising:
    a storage unit that stores therein an offtrack amount of a head of the storage apparatus when the head writes data in each servo frame on the storage medium using a plurality of servo frames recorded on the storage medium;
    a calculating unit that calculates an offtrack amount corresponding to a next servo frame, which is a servo frame present next to a data-writing-complete servo frame for which the head has completed data writing, based on the offtrack amounts stored in the storage unit; and
    a rewrite determining unit that determines, based on the offtrack amount of the next servo frame calculated by the calculating unit, whether the data needs to be rewritten in a sector located before the next servo frame.

2. The control apparatus according to claim 1, further comprising a number-of-sectors determining unit that calculates number of sectors in which the data needs to be rewritten based on the offtrack amounts of the next servo frame and the data-writing-complete servo frame.

3. The control apparatus according to claim 2, wherein the storage unit further stores therein an amplification degree by which a read signal read from each of the servo frames recorded on the storage medium is amplified to a predetermined output level, and
    the number-of-sectors determining unit determines the number of sectors in which the data is to be rewritten based on the offtrack amounts and the amplification degree.

4. A storage apparatus that rewrites data when a write fault occurs while the data is being written to a storage medium included in the storage apparatus, the storage apparatus comprising:
    a storage unit that stores therein an offtrack amount of a head of the storage apparatus when the head writes data in each servo frame on the storage medium using a plurality of servo frames recorded on the storage medium;
    a calculating unit that calculates an offtrack amount corresponding to a next servo frame, which is a servo frame present next to a data-writing-complete servo frame for which the head has completed data writing, based on the offtrack amounts stored in the storage unit; and
    a rewrite determining unit that determines, based on the offtrack amount of the next servo frame calculated by the calculating unit, whether the data needs to be rewritten in a sector located before the next servo frame.

5. The storage apparatus according to claim 4, further comprising a number-of-sectors determining unit that calculates number of sectors in which the data needs to be rewritten based on the offtrack amounts of the next servo frame and the data-writing-complete servo frame.

6. The storage apparatus according to claim 5, wherein the storage unit further stores therein an amplification degree by which a read signal read from each of the servo frames recorded on the storage medium is amplified to a predetermined output level, and
    the number-of-sectors determining unit determines the number of sectors in which the data is to be rewritten based on the offtrack amounts and the amplification degree.

7. A computer-readable recording medium that stores therein a computer program that causes a computer to rewrite data when a write fault occurs while the data is being written to a storage medium included in a storage apparatus, the computer program causes the computer to execute:

storing in a storage unit an offtrack amount of a head of the storage apparatus when the head writes data in each servo frame on the storage medium using a plurality of servo frames recorded on the storage medium;

first calculating including calculating an offtrack amount corresponding to a next servo frame, which is a servo frame present next to a data-writing-complete servo frame for which the head has completed data writing, based on the offtrack amounts stored in the storage unit; and determining, based on the offtrack amount of the next servo frame calculated by the calculating unit, whether the data needs to be rewritten in a sector located before the next servo frame.

8. The computer-readable recording medium according to claim 7, wherein the computer program further causes the computer to execute second calculating including number of sectors in which the data needs to be rewritten based on the offtrack amounts of the next servo frame and the data-writing-complete servo frame.

9. The computer-readable recording medium according to claim 8, wherein the storing further includes storing in the storage unit an amplification degree by which a read signal read from each of the servo frames recorded on the storage medium is amplified to a predetermined output level, and the second calculating includes calculating the number of sectors in which the data is to be rewritten based on the offtrack amounts and the amplification degree.

* * * * *